US006999131B2

(12) United States Patent
Kishimoto et al.

(10) Patent No.: US 6,999,131 B2
(45) Date of Patent: Feb. 14, 2006

(54) VIDEO OUTPUT APPARATUS AND OUTPUT VIDEO CHANGEOVER CONTROL METHOD

(75) Inventors: Seiji Kishimoto, Kawasaki (JP); Kosuke Kubota, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 678 days.

(21) Appl. No.: 09/780,499

(22) Filed: Feb. 12, 2001

(65) Prior Publication Data

US 2001/0015771 A1 Aug. 23, 2001

(30) Foreign Application Priority Data

Feb. 23, 2000 (JP) .............................. 2000-045503

(51) Int. Cl.
*H04N 3/27* (2006.01)
(52) U.S. Cl. ..................................... 348/705
(58) Field of Classification Search ................ 348/705, 348/706, 500, 510, 521, 554, 159, 153, 512, 348/516; 345/213, 698–699, 3.2
See application file for complete search history.

(56) References Cited

U.S. PATENT DOCUMENTS

| | | | | |
|---|---|---|---|---|
| 4,532,547 A | * | 7/1985 | Bennett | 348/518 |
| 4,764,812 A | * | 8/1988 | Hamley | 348/512 |
| 4,989,085 A | | 1/1991 | Elberbaum | |
| 5,264,929 A | * | 11/1993 | Yamaguchi | 348/159 |
| 5,335,014 A | * | 8/1994 | Elberbaum | 348/159 |
| 5,369,510 A | * | 11/1994 | Taguchi | 358/529 |
| 5,420,856 A | * | 5/1995 | Kerns | 370/58.1 |
| 5,557,342 A | * | 9/1996 | Eto et al. | 348/706 |
| 5,579,060 A | * | 11/1996 | Elberbaum | 348/705 |
| 5,731,799 A | | 3/1998 | Kee et al. | |
| 5,808,693 A | * | 9/1998 | Yamashita et al. | 348/554 |
| 5,822,018 A | * | 10/1998 | Farmer | 348/705 |
| 5,870,139 A | * | 2/1999 | Cooper et al. | 348/159 |
| 5,995,140 A | * | 11/1999 | Cooper et al. | 348/159 |
| 6,008,867 A | * | 12/1999 | Cooper et al. | 348/705 |
| 6,314,523 B1 | * | 11/2001 | Voltz | 713/324 |
| 6,535,208 B1 | * | 3/2003 | Saltchev et al. | 345/213 |
| 2001/0019360 A1 | | 9/2001 | Tanaka et al. | |

FOREIGN PATENT DOCUMENTS

| | | |
|---|---|---|
| EP | 0497377 | 8/1992 |
| EP | 497377 | 8/1992 |
| GB | 2316593 | 2/1998 |
| JP | 63-258172 | 10/1988 |
| JP | 7-134577 | 5/1995 |
| JP | 9-271019 | 10/1997 |

OTHER PUBLICATIONS

English Language Abstract of JP 63-258172.

* cited by examiner

*Primary Examiner*—Paulos M. Natnael
(74) *Attorney, Agent, or Firm*—Greenblum & Bernstein, P.L.C.

(57) ABSTRACT

When a changeover instruction is input to video output changeover control section 108, power control section 112 turns on the power to changeover target video output section 102. Timing change section 111 synchronizes sync signal Y output by changeover target video output section 102 with sync signal X output by changeover source video output section 101. Power control section 112 turns off the power to changeover source video output section 101.

6 Claims, 6 Drawing Sheets

VIDEO OUTPUT APPARATUS AND OUTPUT VIDEO CHANGEOVER CONTROL METHOD

BACKGROUND OF THE INVENTION

1. Field of the Invention

The present invention relates to a video output apparatus and output video changeover control method used for a moving image digital transmission apparatus and storage apparatus.

2. Description of the Related Art

With the increasing level of integration of communication terminal apparatuses, etc. in recent years, a plurality of video output means (signal sources) such as a camera and circuit for processing stored video data are mounted on a single apparatus. Since such an apparatus having a plurality of signal sources is normally provided with only one display apparatus such as an LCD (liquid crystal display) panel, signals from a plurality of signal sources are switched and displayed as appropriate. That is, in the above apparatus, a plurality of signal sources is configured to share one display means. A signal source normally outputs a set of a video signal and sync signal.

When an apparatus having such a plurality of signal sources switches between those signal sources, sync signals are sometimes not output to a display apparatus at fixed intervals, which results in a problem of causing disturbance on images displayed until sync signals and video signals become stable, giving the user unpleasant impression.

A technology to reduce this disturbance of images displayed is disclosed in the Unexamined Japanese Patent Publication No.HEI 7-134577 (hereinafter referred to as "conventional example 1") as a "Display apparatus". When images displayed are switched by a changeover between signal sources, etc., the display apparatus described in this conventional example 1 displays fixed colors such as black on a display screen only for a predetermined period and displays images free of disturbance when the video signals and sync signals of the target signal source become stable.

Then, conventional example 2, which is a technology to reduce disturbance of images displayed and is different from conventional example 1 will be explained. This conventional example 2 uses a sync signal common to all signal sources by supplying a sync signal output from one signal source to other signal sources. Thus, conventional example 2 can eliminate discrepancies between sync signals during a changeover and thereby reduce disturbance of images displayed.

However, conventional examples 1 and 2 have the following problems. That is, conventional example 1 displays images in a single color during a changeover, giving the user an unpleasant impression. Conventional example 2 always needs to operate the signal source to supply sync signals even when a video signal output from another signal source is displayed, having a problem of increasing power consumption.

SUMMARY OF THE INVENTION

It is an object of the present invention to provide a video output apparatus and output video changeover control method capable of changing video signals by hiding the changeover of images displayed from the user and suppressing power consumption to a low level.

This object can be attained by changing the output timing of a sync signal of the target signal source to the output timing of a sync signal of the signal source to be changed when signal sources to supply video signals to the display apparatus are changed. More specifically, the object of the present invention is attained by generating a reset signal synchronized with the sync signal to be changed and synchronizing the target sync signal with this reset signal and thereby synchronizing the target sync signal with the sync signal to be changed

DETAILED DESCRIPTION OF THE PREFERRED EMBODIMENTS

The above and other objects and features of the invention will appear more fully hereinafter from a consideration of the following description taken in connection with the accompanying drawing wherein one example is illustrated by way of example, in which;

With reference now to the attached drawings, embodiments of the present invention will be explained in detail below.

(Embodiment 1)

Figure 1:
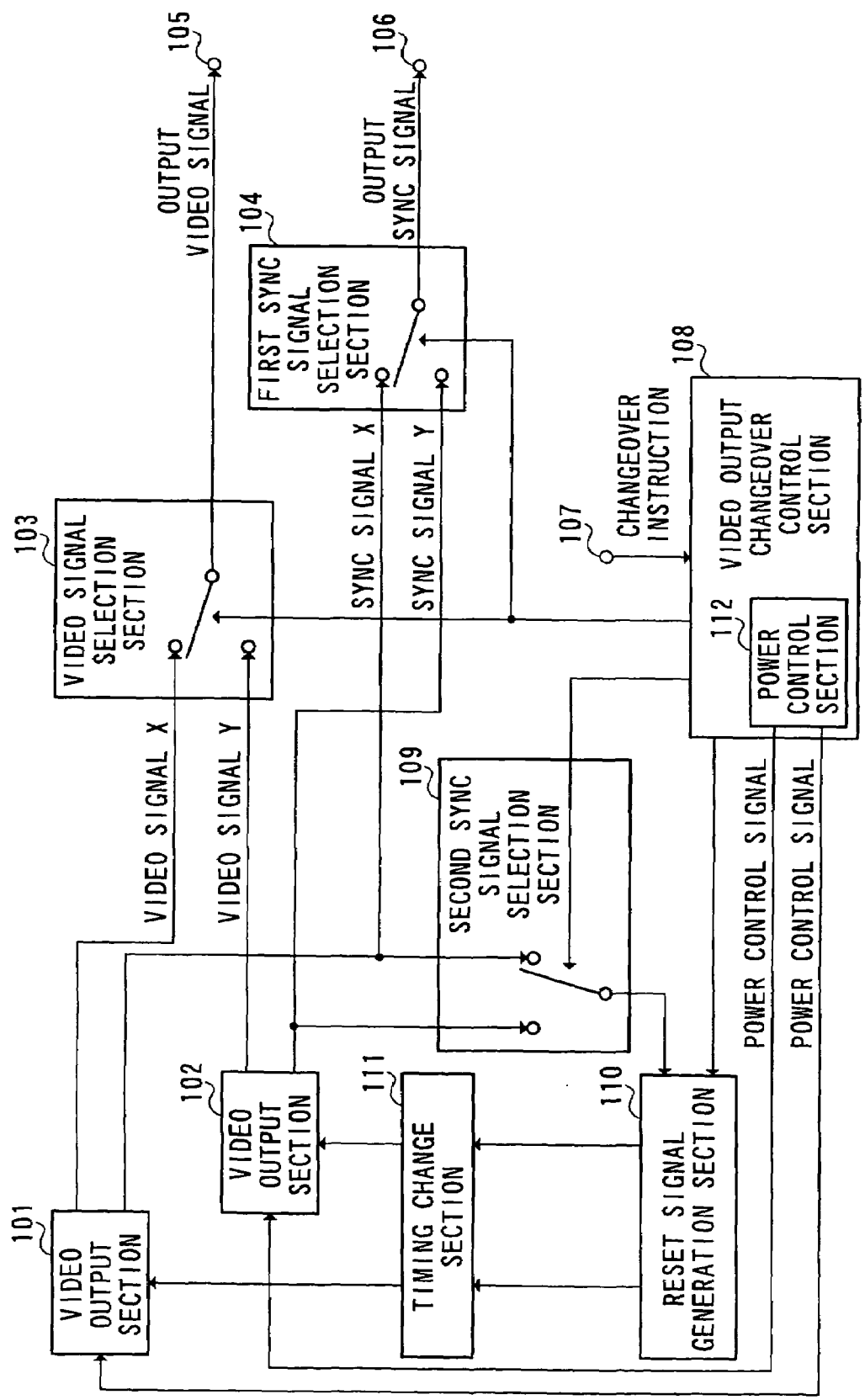
FIG. 1 is a block diagram showing a configuration of a video output apparatus according to Embodiment 1 of the present invention.

FIG. 1 is a block diagram showing a configuration of a video output apparatus according to Embodiment 1 of the present invention. Video output section 101 creates predetermined sync signal X and video signal X corresponding to this sync signal X, outputs video signal X to video signal selection section 103 and outputs sync signal X to first sync signal selection section 104 and second sync signal selection section 109. On the other hand, video output section 102 creates predetermined sync signal Y and video signal Y corresponding to this sync signal Y, outputs video signal Y to video signal selection section 103 and outputs sync signal Y to first sync signal selection section 104 and second sync signal selection section 109. These video output section 101 and video output section 102 output, for example, a video signal stored in memory and a video signal captured from an image pickup apparatus such as a camera. That is, video output section 101 and video output section 102 are the signal sources that supply a video signal and sync signal to a display apparatus such as an LCD (liquid crystal display)

panel, which is not shown. The internal configurations of these video output section 101 and video output section 102 will be described later.

As a video sync signal, two kinds of sync signals are used, a vertical sync signal for synchronization in the vertical direction and a horizontal sync signal for synchronization in the horizontal direction. These sync signals have same control such as a changeover, and therefore the vertical sync signal and horizontal sync signal are collectively called a "sync signal" and the path through which this sync signal passes is expressed with one transmission path line.

Upon acquiring a changeover instruction instructing that an image displayed be changed and indicating the target video output section (that is, signal source) from input terminal 107, video output changeover control section 108 controls video signal selection section 103 and first sync signal selection section 104 so that video signal selection section 103 and first sync signal selection section 104 select the video signal and sync signal output from the target video output section indicated by the changeover signal above. According to the control of video output changeover control section 108, video signal selection section 103 selects either video signal X or video signal Y as the target video signal and outputs the selected video signal from output terminal 105 to a display apparatus, which is not shown. In this way, either video signal X or video signal Y output from video output section 101 or video output section 102 is selected by video signal selection section 103 and output as the output video signal.

According to the control of video output changeover control section 108, first sync signal selection section 104 selects either video signal X or video signal Y as the target sync signal and outputs the selected sync signal from output terminal 106 to a display apparatus, which is not shown.

In this way, video output section 101 and video output section 102 serve as the signal sources that supply a video signal and sync signal to a display apparatus (not shown) provided in the posterior stage of the video output apparatus according to this embodiment.

Upon acquiring a changeover instruction from input terminal 107, video output changeover control section 108 controls second sync signal selection section 109 so that second sync signal selection section 109 selects the source sync signal to be changed. According to the control of video output changeover control section 108, second sync signal selection section 109 selects either sync signal X or sync signal Y as the source sync signal to be changed and outputs the selected sync signal to reset signal generation section 110.

Furthermore, upon acquiring a changeover instruction, video output changeover control section 108 controls reset signal generation section 110 to generate a reset signal. According to the control of video output changeover control section 108, reset signal generation section 110 generates a reset signal synchronized with a sync signal output from the source video output to be changed and outputs the generated reset signal to timing change section 111. Timing change section 111 outputs the reset signal to the target video output section, that is, video output section 101 or video output section 102 at an appropriate timing and thereby synchronizes the sync signal (here, sync signal X or sync signal Y) output from this target video output section with the reset signal.

On the other hand, video output changeover control section 108 is configured to include power control section 112, and when a changeover instruction is input to video output changeover control section 108, power control section 112 outputs a power control signal that instructs whether the power to the target video output section should be turned on or off.

As described above, a power control signal or reset signal is input to the target video output section, that is, video output section 101 or video output section 102. Upon acquiring a power control signal instructing the power to be turned on, target video output section 101 or video output section 102 turns on the power, drives the sync signal generation circuit included in the video output section and turns on power to a video signal supply circuit equipped with a circuit that reconstructs a video signal from the signal stored in video signal memory and an output circuit that outputs a video signal, etc. so as to enable a video signal to be output.

Figure 2:
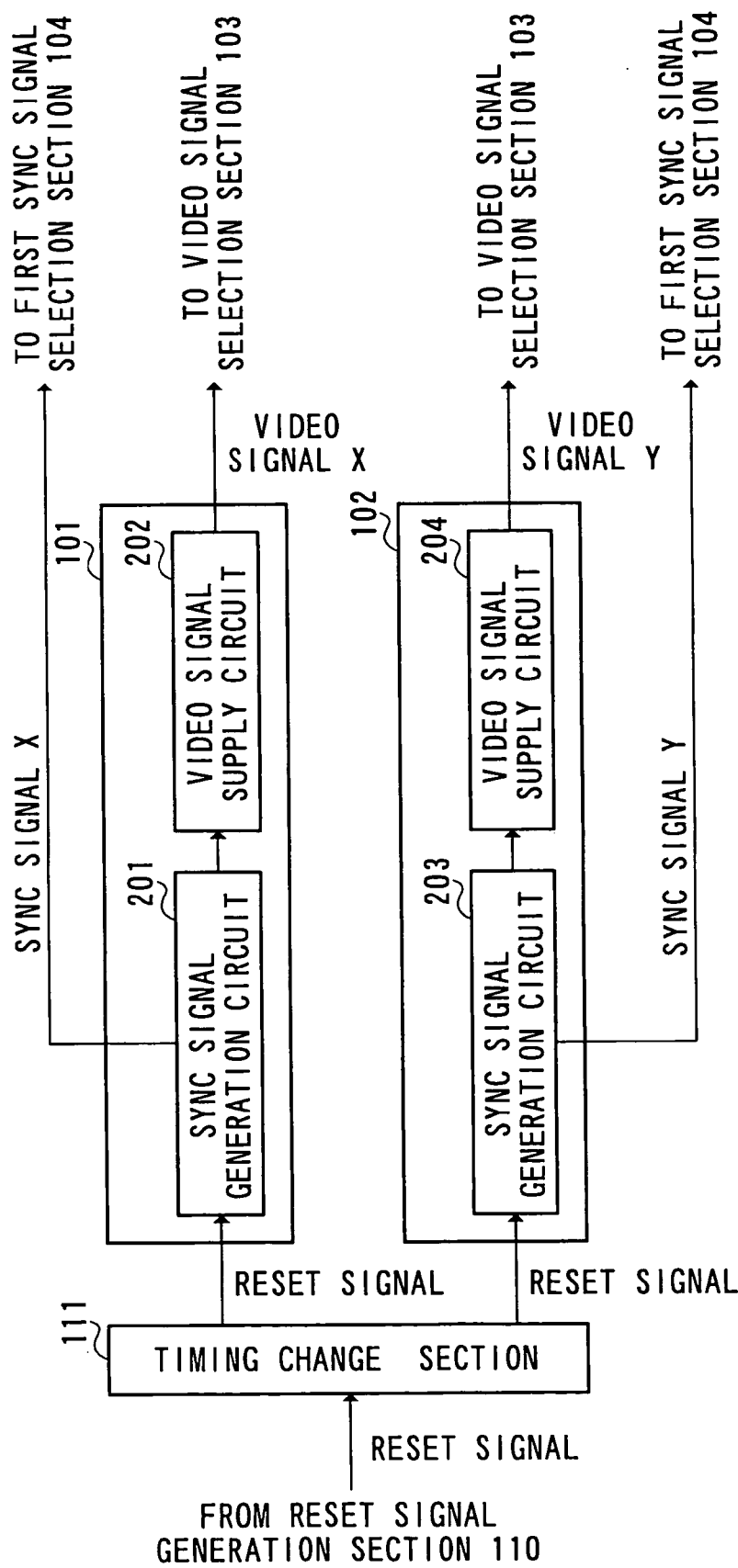
FIG. 2 illustrates part of a configuration of the video output apparatus according to Embodiment 1 of the present invention.

Then, a configuration of the video output apparatus according to this embodiment will be explained in detail with reference to FIG. 2. FIG. 2 is a block diagram showing part of a configuration of the video output apparatus of this embodiment. In FIG. 2, the same components as those in FIG. 1 are assigned the same reference numerals and detailed explanations thereof will be omitted. In FIG. 2, of the components shown in FIG. 1, the descriptions of video signal selection section 103, first sync signal selection section 104, output terminal 105, output terminal 106, input terminal 107, video output changeover control section 108, second sync signal selection section 109, reset signal generation section 110 and power control section 112 will be omitted.

As shown in this FIG. 2, video output section 101 is configured to include sync signal generation circuit 201 and video signal supply circuit 202, and video output section 102 is configured to include sync signal generation circuit 203 and video signal supply circuit 204.

When the count of reference clocks reaches a predetermined number, sync signal generation circuit 201 outputs sync signal X to video signal supply circuit 202 as well as first sync signal selection section 104 and second sync signal selection section 109 shown in FIG. 1. Upon reception of sync signal X from sync signal generation circuit 201, video signal supply circuit 202 outputs a video signal captured by a picture pickup apparatus (not shown) such as a camera, a video signal stored in memory (not shown) beforehand and a video signal, etc. transmitted from an external apparatus to video signal selection section 103 as video signal X. Furthermore, when the count of reference clocks reaches a predetermined number, sync signal generation circuit 203 outputs sync signal Y to video signal supply circuit 204 as well as first sync signal selection section 104 and second sync signal selection section 109 shown in FIG. 1. Upon reception of sync signal Y from sync signal generation circuit 203, video signal supply circuit 204 outputs a video signal captured by a picture pickup apparatus (not shown) such as a camera, a video signal stored in memory (not shown) beforehand and a video signal, etc. transmitted from an external apparatus to video signal selection section 103 as video signal Y. A video signal with a large amount of data is normally compressed using a coding system such as JPEG and MPEG and stored in memory.

Immediately after receiving a reset signal from timing change section 111, sync signal generation circuit 201 and sync signal generation circuit 203 output sync signal X or sync signal Y. That is, inputting of a reset signal from timing change section 111 changes the output timing of a sync signal output from the sync signal generation circuit (that is, sync signal generation circuit 201 or sync signal generation circuit 203) equipped with the target video output section.

Figure 3:
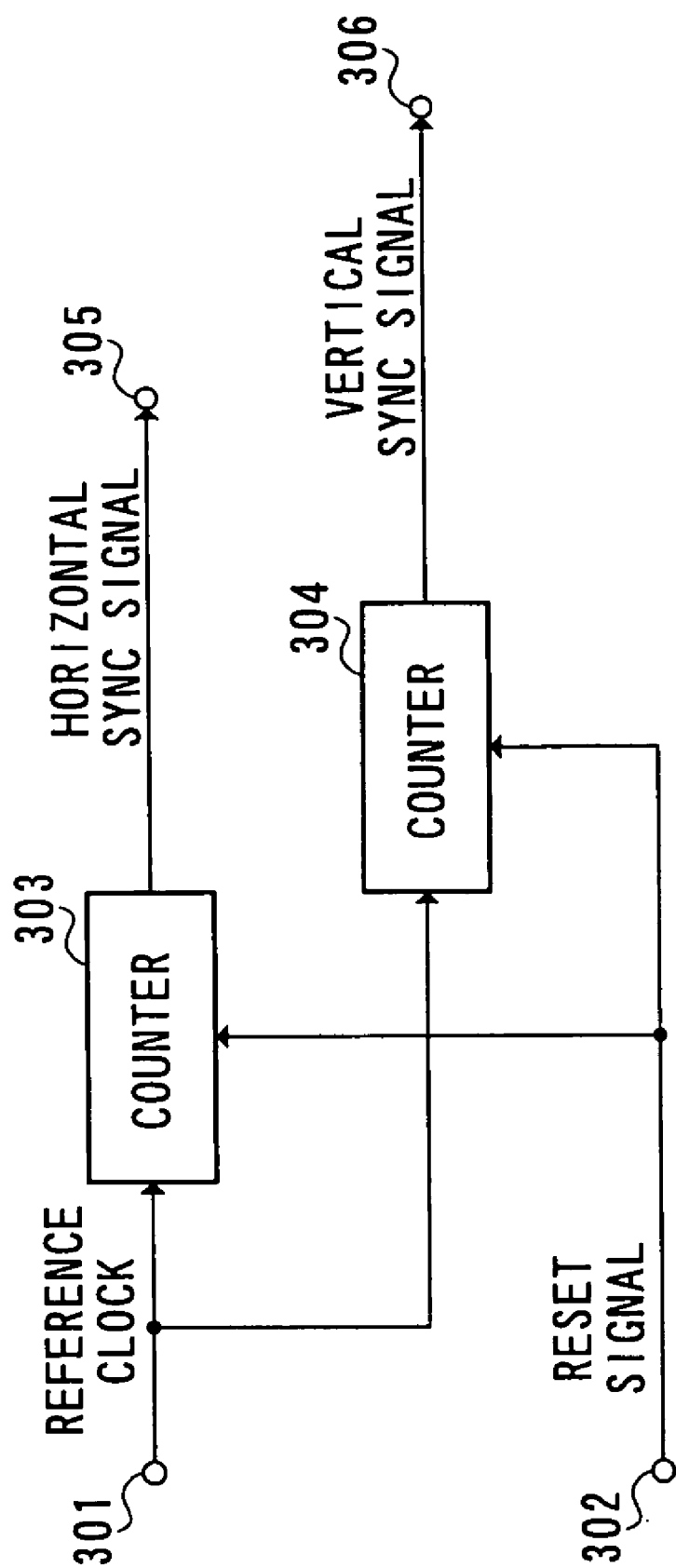
FIG. 3 is a block diagram showing a configuration of a sync signal generation circuit.

Then, with reference to FIG. 3, the internal configurations of sync signal generation circuit 201 and sync signal generation circuit 203 will be explained. FIG. 3 is a block diagram showing the internal configuration of sync signal generation circuit 201. Sync signal generation circuit 203 has almost the same configuration as that of sync signal generation circuit 201, and therefore only a detailed explanation of sync signal generation circuit 201 will be given, whereas a detailed explanation of sync signal generation circuit 203 will be omitted. Sync signal generation circuit 201 is provided with counter 303 that outputs a horizontal sync signal and counter 304 that outputs a vertical sync signal.

In sync signal generation circuit 201 above, a reference clock is input from input terminal 301 to counter 303 and counter 304. Counter 303 counts reference clocks and when the count of reference clocks reaches a predetermined number, counter 303 outputs a horizontal sync signal. The horizontal sync signal is output to counter 304 and at the same time output from output terminal 305 to outside the circuit. Counter 304 counts reference clocks and when the count of reference clocks reaches a predetermined number, counter 304 outputs a vertical sync signal in synchronization with the horizontal sync signal. The vertical sync signal is output from output terminal 306 to outside the circuit.

On the other hand, through input terminal 302, the reset signal output from timing change section 111 is input to counter 303 and counter 304. When the reset signal is input to counter 303 and counter 304, the count of reference clocks counted so far is reset to "0" and counting of reference clocks is restarted at the time of reset. Moreover, counter 303 outputs a horizontal sync signal triggered by the reset signal from timing change section 111 and counter 304 outputs a vertical sync signal triggered by the reset signal from timing change section 111. That is, counter 303 and counter 304 output a horizontal sync signal and vertical sync signal, respectively for every predetermined number of clocks in horizontal and vertical directions from the time at which the reset signal is input. This predetermined number of clocks is changed as appropriate according to the configuration of the apparatus, etc. In this embodiment, suppose this predetermined number of clocks is M clocks in the horizontal direction and N clocks in the vertical direction. Then, counter 303 outputs a horizontal sync signal every time the number of reference clocks countered reaches M clocks and counter 304 outputs a vertical sync signal every time the number of reference clocks countered reaches N clocks.

Figure 4:
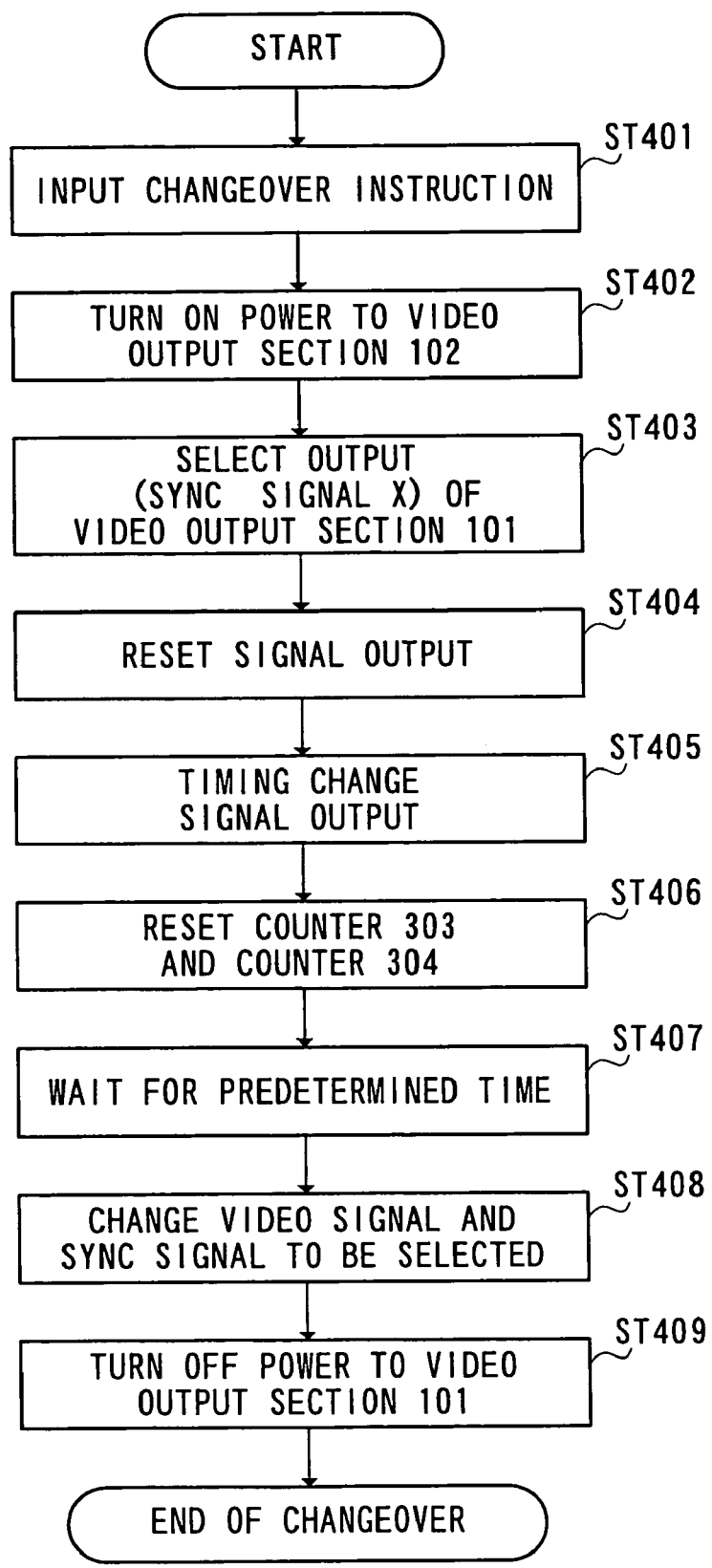
FIG. 4 is a flow chart to explain the changeover operation of a signal source to supply video signals.

Next, the changeover operation of the video output section (that is, signal source of the output video signal) in the video output apparatus in the above configuration will be explained with reference to FIG. 4. FIG. 4 is a flow chart to explain the operation of changing the supply source of a video signal. In this embodiment, the case where the signal source of an output video signal is changed from video output section 101 to video output section 102 will be explained as an example.

First, in step (hereinafter referred to as "ST") 401, a changeover instruction instructing that the signal source of an image to be displayed on the display apparatus be changed from video output section 101 to video output section 102 is input from input terminal 107 to video output changeover control section 108. Then, in ST402, a power control signal is input from power control section 112 to video output section 102, which is the target video output section (signal source) and the power to video output section 102 is turned on.

Then, in ST403, video output changeover control section 108 instructs second sync signal selection section 109 to select sync signal X from video output section 101 to be changed. Second sync signal selection section 109 selects sync signal X and outputs to reset signal generation section 110.

Then, in ST404, video output changeover control section 108 instructs reset signal generation section 110 to output a reset signal to timing change section 111. Reset signal generation section 110 generates a reset signal synchronized with sync signal X generated by source video output section 101 to be changed output from second sync signal selection section 109 and outputs the reset signal to timing change section 111. The operation of generating this reset signal will be described later.

In ST405, the reset signal is output from timing change section 111 that has acquired the reset signal to target video output section 102 at an appropriate timing, that is, the timing at which reset signal generation section 110 generates a reset signal (hereinafter referred to as "reset signal generation timing") or the timing that arrives every N clocks from the reset signal generation timing (hereinafter referred to as "change timing"). Thus, a reset signal is output from timing change section 111 at the "reset signal generation timing" that matches the output timing of sync signal X at source video output section 101 to be changed or the "change timing" that matches the output timing of sync signal X at same source video output section 101 to be changed. That is, the reset signal output from timing change section 111 is synchronized with sync signal X output by source video output section 101.

Then, in ST406, counter 303 and counter 304 equipped with video output section 102 are reset based on a reset signal output from timing change section 111. That is, when a reset signal is input, the counts of counter 303 and counter 304 provided for sync signal generation circuit 203 are reset to "0". This makes counter 303 and counter 304 restart counting of reference clocks at the time at which the reset signal is input, and therefore a horizontal sync signal or vertical sync signal is output for every N clocks from the time at which the reset signal is input from timing change section 111. That is, sync signal Y output from target video output section 102 is synchronized with the reset signal and at the same time synchronized with sync signal X at source video output section 101 to be changed.

Then, in ST407, after waiting for a predetermined time until video signal Y output from video output section 102 becomes stable, the process moves on to ST408. In ST408, video output changeover control section 108 instructs video signal selection section 103 and first sync signal selection section 104 to select an output signal from image output section 102. In this way, video signal selection section 103 outputs video signal Y whose signal source is video output section 102 as an output video signal. On the other hand, first sync signal selection section 104 outputs sync signal Y whose signal source is video output section 102 as an output sync signal.

Then, in ST409, a power control signal is input from video output changeover control circuit 108 to video output section 101 and the power to video output section 101 is turned off.

Then, the operation of changing the video output sections (that is, signal sources) will be explained with reference to FIG. 5A to FIG. 5G.

Figure 5:
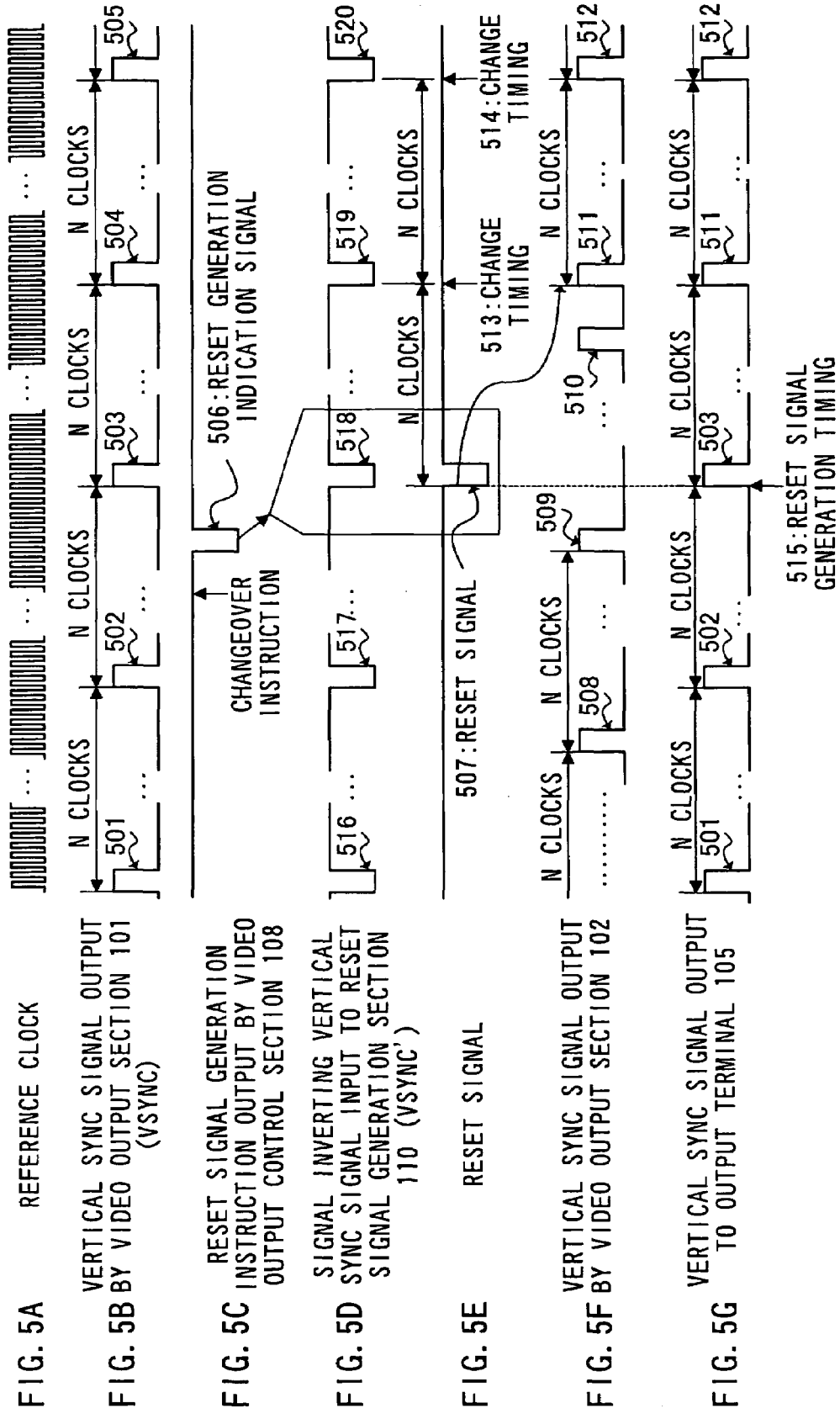
FIG. 5A illustrates a reference clock.
FIG. 5B illustrates VSYNC generated by a video output section of a changeover source.
FIG. 5C illustrates a reset generation instruction signal.
FIG. 5D illustrates an inverted VSYNC signal.
FIG. 5E illustrates a reset signal.
FIG. 5F illustrates VSYNC generated by the source video output section to be changed.
FIG. 5G illustrates a sync signal output to a display apparatus.

The signal shown in FIG. 5A is a reference clock input to counter 303 and counter 304. The reference clock is a cyclic signal that has a certain accurate time interval and is used as a reference to establish synchronization.

The signal shown in FIG. 5B is a pulse signal including a vertical sync signal (hereinafter referred to as "VSYNC") generated by sync signal generation circuit 201 provided for video output section 101. In sync signal generation circuit 201 provided for video output section 101, clock 303 and clock 304 count reference clocks and the pulse signal turns ON when this count reaches N clocks and rectangular vertical sync signals 501 to 505 made up of a rising section and falling section are output. That is, clock 303 and clock 304 output VSYNC for every N reference clocks. Here, sync signal generation circuit 201 outputs both a vertical sync signal and horizontal sync signal, but since the operation of generating a vertical sync signal is almost the same as the operation of generating a horizontal sync signal, for simplicity of explanations, only a vertical sync signal (VSYNC) will be shown in FIG. 5A to FIG. 5G, whereas detailed explanations of the horizontal sync signal will be omitted.

The signal shown in FIG. 5C is a signal instructing the generation of a reset signal (hereinafter referred to as "reset generation instruction signal") output by video output changeover control section 108. This reset generation instruction signal 506 is output to reset signal generation section 110 by video output changeover control section 108 that has acquired a changeover instruction from input terminal 107.

The signal shown in FIG. 5D is a signal obtained by inverting VSYNC shown in FIG. 5B by reset signal generation section 110. Hereinafter, this inverted VSYNC signal is referred to as "VSYNC'". That is, VSYNC'516, VSYNC'517, VSYNC'518, VSYNC'519 and VSYNC'520 are signals obtained by inverting VSYNC 501, VSYNC 502, VSYNC 503, VSYNC 504 and VSYNC 505, respectively.

The signal shown in FIG. 5E is reset signal 507 output from reset signal generation section 110 to timing change section 111. Reset signal generation section 110 extracts one of VSYNC's generated after receiving a reset generation instruction signal output from video output changeover control section 108 as a reset signal and outputs to timing change section 111. FIG. 5D and FIG. 5E describe the case where the VSYNC' generated at the earliest timing after the reset generation instruction signal is received is extracted as a reset signal and output to timing change section 111 as an example. After receiving the reset signal, timing change section 111 outputs this reset signal to target video output section 102 at an appropriate timing, that is, the reset signal generation timing or a change timing that arrives every N clocks from the reset signal generation timing. FIG. 5E shows change timing 513 that arrives N clocks after the reset signal generation timing and change timing 514 that arrives 2N clocks (that is, N clocks after change timing 513) after the reset signal generation timing as an example of the "change timing" above.

In FIG. 5D and FIG. 5E, a reset signal is extracted from VSYNC', which is inverted VSYNC, but in the case where VSYNC is not a pulse signal as shown in the figure but a level signal made up of a low signal that lasts for a certain period of time or high signal that lasts for a certain period of time, it is also possible to generate a reset signal at a timing that matches the level rising section or falling section.

The signal shown in FIG. 5F is a pulse signal including a vertical sync signal output from target video output section 102. FIG. 5F shows the case where a reset signal is input from timing change section 111 to target video output section 102 at change timing 513 and immediately after the reset signal is input, video output section 102 outputs a sync signal.

Before inputting a reset signal, counter 304 of target video output section 102 counts reference clocks. When this count reaches N clocks, the pulse signal turns ON, rectangular vertical sync signals 508 to 510 made up of a rising section and falling section as shown in FIG. 5F are output. When reset signal 507 is output from timing change section 111 at change timing 513, counter 304 outputs vertical sync signal 511 and resets the number of reference clocks counted until reset signal 507 is input and restarts counting of reference clocks. In this way, counter 304 outputs a vertical sync signal every N clocks from change timing 513.

Thus, until reset signal 507 is received at change timing 513, video output section 102 outputs vertical sync signals 508 to 510 generated at the own timing, receives reset signal 507 and then outputs vertical sync signal 511 and vertical sync signal 512 at a timing synchronized with reset signal 507, that is, a timing synchronized with a sync signal output from video output section 101 to be changed.

Therefore, as shown in FIG. 5G, from output terminal 106, a vertical sync signal from source video output section 101 to be changed is output before change timing 513 and a vertical sync signal from source video output section 102 from change timing 513 on (that is, simultaneously with change timing 513 or after change timing 513). The vertical sync signal output from this output terminal 106 is output always at constant intervals irrespective of before or after change timing 513 as is apparent from FIG. 5G.

As shown above, according to this embodiment, when target video output section 102 is selected from among a plurality of video signal output sections (that is, video output section 101 and video output section 102) to change an image to be supplied to the display apparatus according to a changeover instruction input from input terminal 107, the output timing of sync signal Y output from target video output section is changed by timing change section 111. Since timing change section 111 changes the timing in such a way that sync signal Y output by target video output section 102 is synchronized with sync signal X output by source video output section 101 to be changed, the sync signal output to the display apparatus has a constant interval before and after the changeover takes place. Thus, the display apparatus always receives a sync signal with a constant interval, producing an effect that images displayed are not disturbed. Thus, the user of the video output apparatus according to this embodiment can comfortably change images without being annoyed by disturbance of images displayed.

Furthermore, in this embodiment, reset signal generation section 110 generates a reset signal synchronized with source video output section 101 to be changed and timing change section 111 changes the output timing of a sync signal in target video output section 102 based on this reset signal, and therefore it is not necessary to continue operation of source video output section 101 even after display apparatus are changed.

That is, since the generation timing (that is, reset signal generation timing) of the reset signal generated by reset signal generation section 110 matches the output timing of the sync signal output from source video output section 101 to be changed, timing change section 111 can acquire the output timing of sync signal X output from source video output section 101 by acquiring a reset signal without the need to acquire sync signal X output from source video output section 101. Timing change section 111 synchronizes the output timing of a sync signal at target video output section 102 with the output timing of a sync signal at source video output section 101 acquired based on a reset signal. In this way, the output timing of a sync signal at source video output section 102 to be changed is synchronized not "directly" with the output timing of a sync signal at source video output section 101 but "via a reset signal".

Changing the output timing of a sync signal at source video output section 102 to be changed according to the control of reset signal generation section 110 and timing change section 111 in this way determines the output timing of a sync signal at target video output section 102 independently of source video output section 101, that is, without direct connection with source video output section 101.

As described above, after a reset signal is generated, it is not necessary to continue to operate source video output section 101. Therefore, in this embodiment, after video signal selection section 103 and first sync signal selection section 104 change the video signal and sync signal to be selected, power control section 112 performs control turning off the power to source video output section 101. Thus, the video output apparatus according to this embodiment can reduce power consumption more than the conventional video output apparatus.

In contrast to the changeover operation explained in this embodiment, in the case where a changeover is made from video output section 102 to video output section 101, video output section 101, which becomes the changeover target in this case, outputs a sync signal synchronized with the output timing of a sync signal at video output section 102, which becomes the changeover source in this case based on the reset signal output from timing change section 111. From this point too, it is apparent that video output section 102 is independent of video output section 101 with respect to the output timing of a sync signal.

This embodiment has described the case where a sync signal and a video signal corresponding to this sync signal are output from the two video output sections (that is, signal sources) of video output section 101 and video output section 102, but the present invention is not limited to this and all that is required is that a plurality of video output sections (that is, signal sources) that output to a display apparatus a sync signal and a video signal corresponding to this sync signal be provided according to the type of the video signal displayed on the display apparatus.

Furthermore, in this embodiment, the sync signal generation circuit (that is, sync signal generation circuit 201 or sync signal generation circuit 203) provided for the target video output section outputs a sync signal immediately after receiving a reset signal from timing change section 111. However, the sync signal generation circuit provided for the target video output section can also be configured to generate a sync signal N clocks after receiving a reset signal instead of outputting a sync signal immediately after receiving the reset signal.

(Embodiment 2)

The video output apparatus according to the present invention demonstrates outstanding effects especially when mounted on a communication terminal apparatus. This is because a communication terminal apparatus is often carried with the user and used connected to a power supply with a limited capacity such as batteries, and thus a reduction of power consumption is essential.

Figure 6:
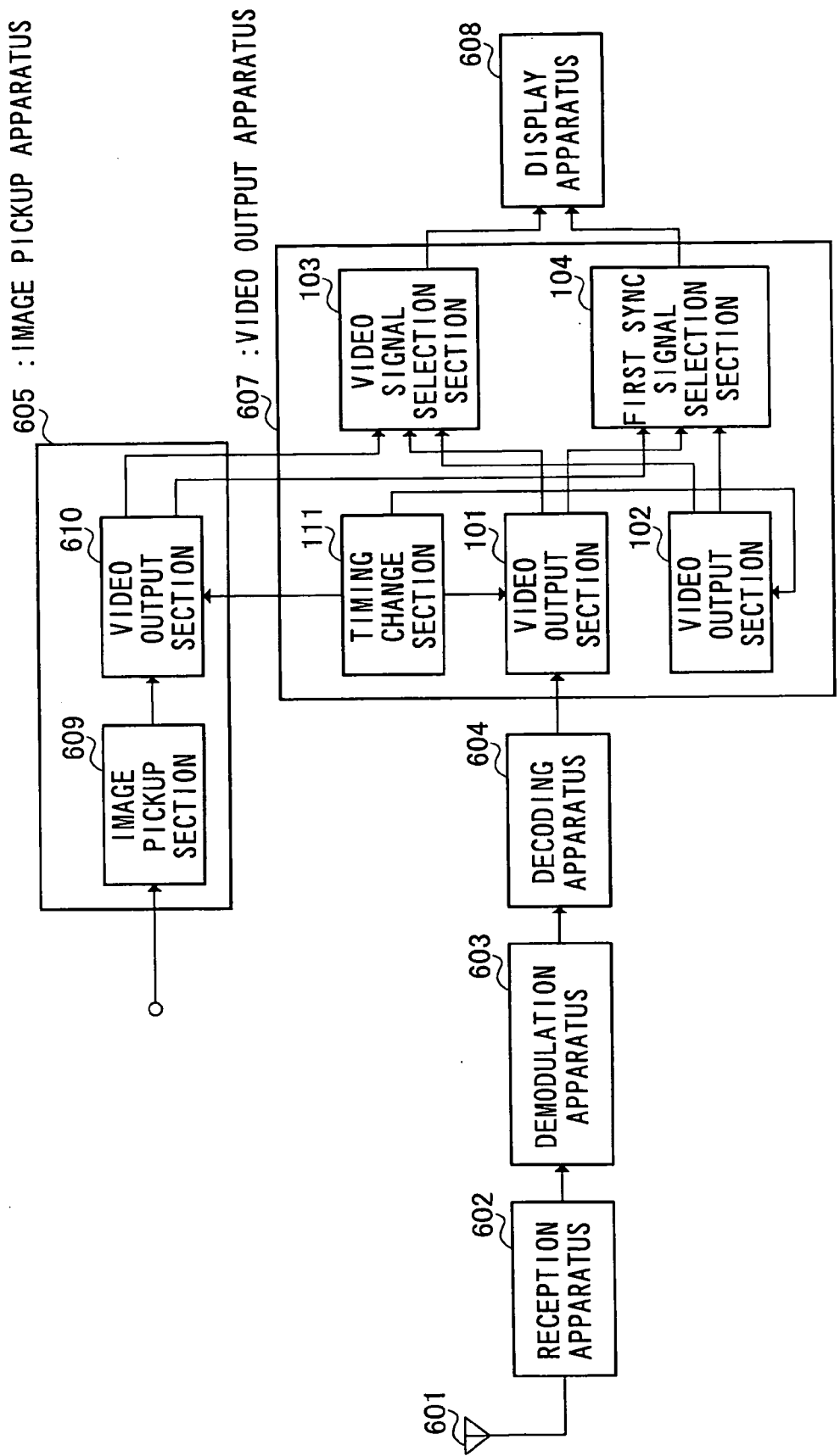
FIG. 6 is a block diagram showing a configuration of a communication terminal apparatus according to Embodiment 2 of the present invention.

Hereinafter, a case where the video output apparatus according to Embodiment 1 of the present invention is mounted on a communication terminal apparatus will be explained with reference to FIG. 6. FIG. 6 is a block diagram showing a configuration of the communication terminal apparatus according to Embodiment 2 of the present invention. In FIG. 6, the same components as those in FIG. 1 according to Embodiment 1 are assigned the same reference numerals as those in FIG. 1 and detailed explanations thereof will be omitted.

Reception apparatus 602 applies predetermined radio reception processing such as frequency conversion to a signal received from antenna 601 and generates a baseband signal. Demodulation apparatus 603 applies predetermined demodulation processing such as QPSK or 16QAM to the baseband signal generated by reception apparatus 602. Decoding apparatus 604 applies predetermined decoding processing to the demodulated signal and obtains a reception video signal. The reception video signal obtained by decoding apparatus 604 is output to video output section 609.

Video output apparatus 607 has the same configuration as that of the video output apparatus shown in FIG. 1 in Embodiment 1. For simplicity of explanations, descriptions of output terminal 105, output terminal 106, input terminal 107, video output changeover control section 108, second sync signal selection section 109 and reset signal generation section 110 are omitted.

Timing change section 111 in this video output apparatus 607 outputs a rest signal to video output section 101, video output section 102 and video output section 610 to synchronize the sync signal after the changeover with the sync signal before the changeover. Image output section 101 outputs the reception video signal received from decoding apparatus 604 to video signal selection section 103 and outputs sync signal X to first sync signal selection section 104. That is, in this embodiment, video output section 101 serves as a signal source of reception video signals.

Video output section 102 stores predetermined video signals in the manufacturing stage of the communication terminal apparatus according to this embodiment. In this Specification, a video signal stored in this video output section 102 is called "stored video signal". Video output section 102 outputs this stored video signal to video signal selection section 103 and outputs sync signal Y to first sync signal selection section 104.

Image pickup apparatus 605 is configured to include image pickup section 609 such as a camera and video output section 610. Image pickup section 609 takes pictures of targets such as persons and landscape, etc. and captures these pictures as video signals. In this Specification, a video signal captured from image pickup section 609 is called "image pickup signal". This image pickup signal is output from image pickup section 609 to video output section 610. Video output section 610 has a configuration similar to that of video output section 101 and video output section 102 and outputs image pickup signals captured by image pickup section 609 to video signal selection section 103. Furthermore, video output section 610 generates sync signal Z through a sync signal generation circuit (not shown) equipped inside and outputs sync signal Z generated to first sync signal selection section 104.

Video signal selection section 103 selects one of a reception video signal, stored video signal or image pickup signal as the target video signal and outputs the selected signal to display apparatus 608. On the other hand, first sync signal selection section 104 selects one of sync signal X, sync signal Y or sync signal Z as the sync signal, the changeover target, and outputs the selected sync signal to display apparatus 608.

Display apparatus 608 synchronizes the video signal output from video signal selection section 103 with the sync signal output from first sync signal selection section 104 and displays the video (image) on the LCD panel.

Then, the operation of changing a video signal supplied to display apparatus 608 in the communication terminal apparatus in the above configuration will be explained. Here, a case where a video signal supplied to display apparatus 608 is changed from a reception video signal to an image pickup signal, that is, a case where the signal source of the video signal supplied to display apparatus 608 is changed from video output section 101 to video output section 610 will be explained as an example.

Before starting the changeover operation, an image formed based on the reception video signal is displayed on display apparatus 608. This reception video signal is the reception signal received from antenna 601, which has been converted to a baseband signal by reception apparatus 602, demodulated by demodulation apparatus 603, decoded by decoding apparatus 604 and input to video output section 101.

First, when a changeover instruction instructing that the signal source of an image to be displayed on display apparatus 608 be changed from video output section 101 to video output section 102 is input, the power to video output section 610, which is the target video output section (signal source) is turned on. More specifically, a sync signal generation circuit (not shown) included in video output section 610 is driven and at the same time the power to a video signal supply circuit (not shown) equipped with a coding circuit (not shown) that encodes an image pickup signal captured by image pickup section 609, a decoding circuit that decodes coded data and an output circuit that outputs the decoded image pickup signal to the outside of image pickup apparatus 605, etc. so as to enable the image pickup signal to be output.

Then, timing change section 111 that has acquired a reset signal generated based on a changeover instruction outputs a reset signal to target video output section 610 at an appropriate timing. This allows the output timing of sync signal Z output from target video output section 610 to be changed and synchronization between sync signal Z and sync signal X output from source video output section 101 to be changed to be established.

In image pickup apparatus 605, an image pickup signal captured from image pickup section 609 is output to video signal selection section 103 and sync signal Z generated by video output section 610 is output to first sync signal selection section 104. Then, after waiting for a predetermined time until the image pickup signal and sync signal Z become stable, video signal selection section 103 supplies the image pickup signal to display apparatus 608 and first sync signal selection section 104 supplies sync signal Z to display section 608. Display section 608 synchronizes the supplied image pickup signal with sync signal Z and displays the image corresponding to the supplied image pickup signal on the LCD panel.

Finally, a power supply control signal is input to video output section 101 and the power to video output section 101 is turned off.

As shown above, this embodiment mounts video output apparatus 607 according to Embodiment 1 on a communication terminal apparatus, and therefore it is possible to reduce power consumption of the communication terminal apparatus without causing disturbance in an image displayed on display apparatus 608. This embodiment prevents a display image from being disturbed especially when the image taken by image pickup section 609 such as a camera is displayed while a video signal is being downloaded through antenna 601.

In this embodiment, display apparatus 608 forms a display image on an LCD panel, but the present invention is not limited to this and it is also possible to form the display image on a CRT, EL (electro-luminescence) panel, LED matrix display apparatus, etc. Furthermore, this embodiment describes the case where the signal source that supplies a video signal to display apparatus 608 is changed from video output section 101 to video output section 610, but the present invention is not limited to this and it is possible to change the signal source from an arbitrary video output section to another video output section.

As described above, when the signal source that supplies a video signal to a display apparatus is changed, the present invention can reduce power consumption of a communication terminal apparatus without disturbing display images on the display apparatus by changing the output timing of a sync signal of the target signal source to the output timing of a sync signal of the signal source to be changed.

The present invention is not limited to the above described embodiments, and various variations and modifications may be possible without departing from the scope of the present invention.

This application is based on the Japanese Patent Application No.2000-45503 filed on Feb. 23, 2000, entire content of which is expressly incorporated by reference herein.

INDUSTRIAL APPLICABILITY

The present invention is ideally suited to the field of a video output apparatus and output video changeover control method used for a motion picture digital transmission apparatus and storage apparatus.

What is claimed is:

1. A video output apparatus, comprising:
a first video output source and a second video output source that each output a sync signal and a video signal corresponding to said sync signal;
a changeover controller that changes a sync signal and a video signal to supply to a display apparatus, from the sync signal and the video signal of the first video output source over to the sync signal and the video signal of the second video output source;
a reset signal generator that generates a reset signal synchronized with the synch signal of the first video output source, in accordance with the changeover in the changeover controller; and
a timing changer that inputs the reset signal to the second video output source to synchronize the sync signal of the second video output source with the sync signal of the first video output source.

2. The video output apparatus of claim 1, wherein the changeover controller turns off power to the first video output source and turns on power to the second video output source, in accordance with the changeover in the changeover controller.

3. The video output apparatus of claim 1, wherein the timing changer inputs the reset signal to the second video output source at a first timing at which the reset signal generator generates the reset signal and at a second timing that arrives every predetermined number of clock pulses with respect to the first timing.

4. The video output apparatus of claim 1, wherein said second video output source counts a number of reference clock pulses and outputs the sync signal when the counted number of reference clock pulses reaches a predetermined number.

5. The video output apparatus of claim 1, wherein the second video output source resets a number of reference clock pulses when the timing changer inputs the reset signal to said second video output source.

6. A communications terminal apparatus equipped with the video output apparatus of claim 1.

* * * * *